March 10, 1953           D. C. PRINCE           2,631,263
QUICK RESPONSE REGULATING SYSTEM
Filed Feb. 27, 1951
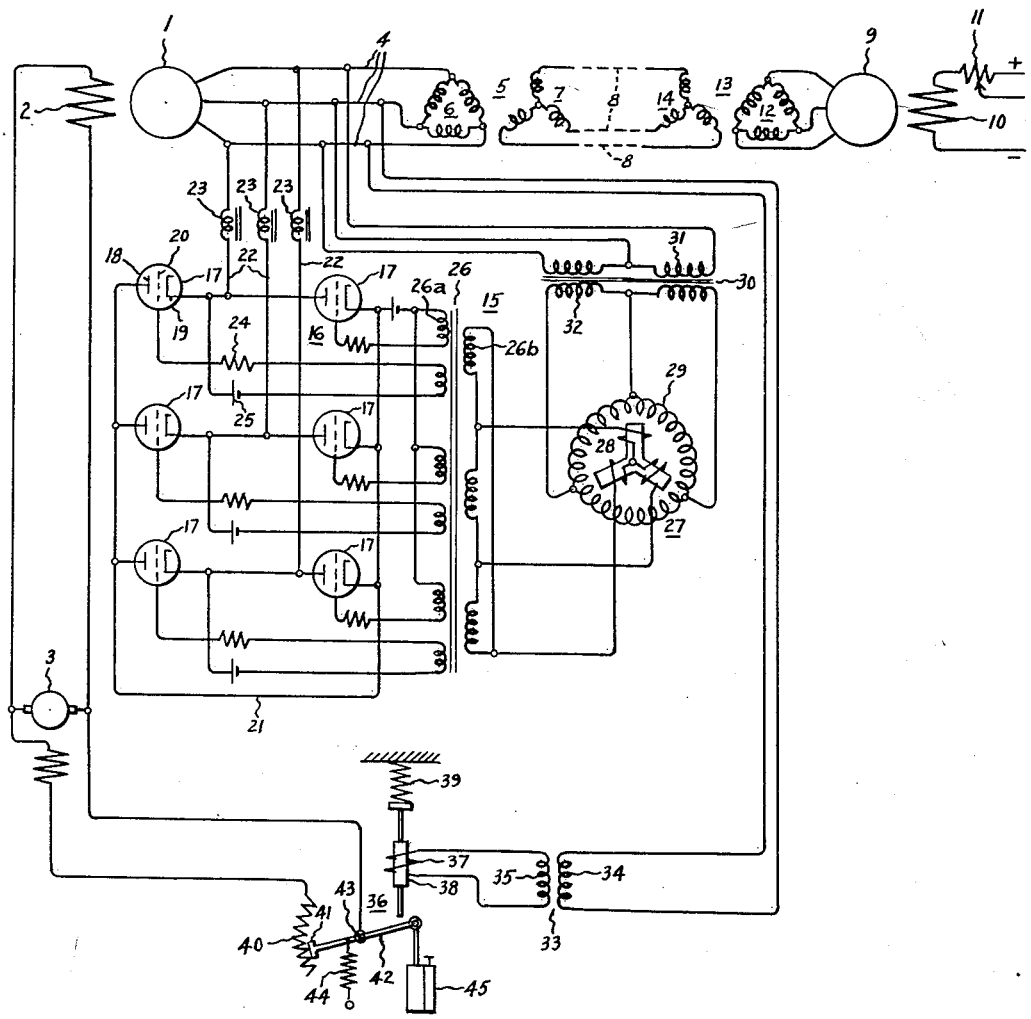
Inventor:
David C. Prince,
by Paul A. Frank
His Attorney.

UNITED STATES PATENT OFFICE 2,631,263

QUICK RESPONSE REGULATING SYSTEM

David C. Prince, Schenectady, N. Y., assignor to General Electric Company, a corporation of New York Application February 27, 1951, Serial No. 212,999

3 Claims. (Cl. 318—143)

My invention relates to alternating current electric power transmission systems, and more particularly to a stabilizer or synchronizing power control for such systems involving the transmission of electric power over long distances.

In long transmission lines of the order of 750 miles or in which the line is operated at or near its natural surge impedance load at normal uniform voltage, transient overloads on the line or phase swings between the machines connected to the line cause the line voltage to dip to an abnormally low value. Instability of phase relations between synchronous machines connected to the lines results in a lack of synchronizing power in the lines so that a considerable amount of additional power is needed as soon as the fault is cleared to restore the system to synchronism.

A method presently employed to stabilize such systems by supplying increased voltage to the line after a fault is described in Patent 2,470,454, granted May 17, 1949, upon application of E. F. W. Alexanderson, in which a reactive device is continually connected to provide a reactive load to the system. In the event of a transient overload or a phase swing, the voltage of the system may be quickly raised to the value required to restore synchronism to the system by removing this reactive load. Conversely increase in the reactive load applied to the system quickly decreases the line voltage of the system.

However a continuous reactive load is demagnetizing and causes increased heating in the generator windings so that a system to which a reactive load is continuously connected during normal operation requires higher generator current capacity than would be required if the reactive load were only temporarily applied to limit excessively high line voltages in case stability is quickly restored to the system by other quick response means after a fault had occurred.

An object of my invention is to provide a new and improved quick response stabilizing system for the transmission of alternating current power.

Another object of my invention is to provide a new and improved system for quickly transmitting stabilizing power between synchronous machines under abnormal conditions.

A further object of my invention is to provide a new and improved stabilizer for an alternating current power transmission system that is quickly operable to exchange reactive power with the system responsive to rate of change in phase angle between terminal apparatus of the system.

In carrying out my invention, an A. C. generator is connected to supply power in a transmission system. An improved quick response under voltage regulator is connected to abnormally increase the field of a D. C. exciter supplying the field of the generator responsive to decrease in line voltage below a predetermined abnormal value. It is almost useless to try to maintain the line at normal voltage during period of fault before the load circuit breakers open but during this time generator excitation can be increasing well above normal so that when the fault is cleared, an abnormally increased line voltage may be available to restore stability. Means responsive to a predetermined increase in line voltage above the predetermined normal value quickly exchanges reactive power with the line during the over-voltage period so as to prevent an excessively high line voltage being reached. Such cooperating combination enables the quick response under voltage regulator to be provided with a dashpot arrangement to delay its return to the normal voltage setting and thereby insure the line a predetermined time interval to regain synchronization after the line voltage returns to or above normal.

For better understanding of my invention, reference is made to the following description and the accompanying drawing, the single figure of which is a schematic representation of a power transmission system incorporating my invention.

In the drawing, a synchronous alternating current transmission system comprises an alternating current generator 1 provided with a field winding 2 which is energized from an exciter 3. Exciter 3 is a direct current generator having a conventional quick response field regulator and excitation equipment. Synchronous generator 1 is connected through transmission conductors 4 and a step-up transformer 5, provided with a primary winding 6 and a secondary winding 7 to a high voltage transmission line having conductors 8. The intermediate portions of conductors 8 are dotted to represent distance, for example, of the order of 750 miles. A synchronous machine 9 represents a receiving station and may be composed of synchronous motors and generators and other power consuming apparatus. Synchronous machine 9 is provided with a field winding 10 energized from a suitable source of direct current indicated by + and − signs through a variable resistance 11 representing regulating equipment which may be similar to that installed at the generator. Receiving station 9 is connected to the secondary winding 12 of a stepdown transformer 13 having a primary winding 14 connected to the transmission line. The usual circuit interrupting means provided for a commercial system are omitted from the drawing to simplify this disclosure.

A reactive current stabilizer 15 similar in construction and operation to the reactive current stabilizer more fully described in the above-mentioned Patent 2,470,454, Alexanderson, is so connected across the generator terminals and so controlled that the value of reactive current taken thereby is varied to provide a voltage drop to compensate for variations in phase relations between the generator and a load due to a transient fault between the transmission line and a load.

Stabilizer 15, as illustrated, comprises a short circuited double way rectifier 16 including six electronic tubes 17 provided with plates 18, cathodes 19 and grids 20 and connected for three phase full wave rectification with one pair of the tubes provided for each phase. The tubes of each of the pairs are connected back to back with the anode of one tube connected to the cathode of the other tube.

Tubes 17 are preferably of the gaseous or vapor type because of the high current carrying capacity of this type of tube and although for simplicity they are shown as thyratron tubes, they may be of the ignitron type of tube where that type of tube is required by the magnitude of current transmitted therethrough.

The direct current circuit of the rectifier comprises a conductor 21 constituting a virtual short circuit of the rectifier output circuit. Rectifier 16 is connected to transmission conductors 4 through conductors 22 and inductive reactance devices 23 having an inductive reactance appreciably higher than that of the inductance device of the usual conventional rectifier circuit. Devices 23 are connected in series with conductors 22. The excitation circuit for rectifier 16 as illustrated is a simplified version of an excitation circuit developed for rectifiers employing thyratrons or ignitrons such as that shown in Patent 2,419,465, granted April 22, 1947, to B. D. Bedford.

To render tubes 17 alternately conductive and non-conductive in proper sequence, grid 20 of each tube is connected to its associated cathode through a current limiting resistance 24, a bias battery 25 and an appropriate phase secondary winding 26a of a grid transformer 26. The primary windings 26b of transformer 26 are connected to be energized by a phase adjusting device 27.

Phase adjusting device 27 may be of rotary type having a movable polyphase secondary winding 28 and a polyphase stator winding 29. A potential transformer 30 is provided with primary windings 31 connected to conductors 4 and secondary windings 32 connected to stator winding 29.

Tubes 17 are biased by batteries 25 to cut off for line voltage less than the normal voltage of machine 9 to control current flow through reactors 23. Upon increase of line voltage to a predetermined value higher than the normal voltage of machine 9 after the fault is cleared by the circuit breakers, current flows through excitation transformer 26, grids 20 and reactors 23 to provide a transient reactance capable of drawing considerable reactive current sufficient to protect the transmission line 8 against an excessively high voltage.

A second potential transformer 33 is provided with a primary 34 connected across two of the conductors 4 and a secondary 35. A quick response under voltage regulator 36 is provided with an operating coil 37 connected to secondary 35 to a be normally picked up at the predetermined normal operating voltage of lines 4. An armature 38 of regulator 36 is biased downward by a compression spring 39 to quickly respond to any decrease in the line voltage below a predetermined sub-normal operating value.

Regulator 36 is provided with a resistance 40 and a movable contact 41 connected in the field circuit of exciter 3. Contact 41 is mounted upon an arm 42 pivoted at 43. A spring 44 is connected to arm 42 to bias resistor 40 to a normal value of resistance corresponding to normal operating voltage of lines 4. When the voltage in lines 4 dips to or below the predetermined sub-normal value, as in the cases of a transient overload or phase swing, armature 38 is quickly forced downward to rotate arm 42 in opposition to the tension of spring 44. As arm 42 is rotated in a clockwise direction, resistance 40 is decreased to abnormally increase excitation of exciter 3 and hence generator 1 in order to provide the additional power required to swing the system back into synchronism as soon as the fault is cleared from the circuit.

During the transient period, therefore, the excitation of generator 1 will be subject to instantaneous increase at the expense of some increased heating due to wattless current in the armature at additional field current in the generator.

As soon as the fault is cleared, the line voltage may increase to a predetermined value above normal and reactive current stabilizer 15 then draws current inversely proportional to the change in phase relations between generator 1 and synchronous machine 9 so that the increase synchronizing power of generator 1 is increasingly absorbed by stabilizer 15 as generator 1 and synchronous machine 9 return to synchronism. When the line voltage increases to or above normal spring 44 tends to gradually return resistor 40 to the normal position corresponding to normal operating voltage in lines 4 against a dashpot 45 adapted to delay the return for a predetermined interval sufficient to insure that generator 1 and synchronous machine 9 are again in synchronism. Little, if any, wattless current is drawn through electronic voltage regulator 15 under normal voltage conditions.

The extra heating of all the equipment of the system involved is limited to the short periods of emergency tending to decrease the necessary design safety factor of the equipment.

The wattless current supplied by the synchronous generator in this system is less than that supplied by the generator of the system in which the rectifier is connected at normal load thereby reducing the generator capacity required for a given load. Also a low current capacity electronic rectifier can be selected since it is energized only on a short time basis.

While there is illustrated and described a particular embodiment of this invention, modifications thereof will occur to those skilled in the art. I desire it to be understood therefore that this invention is not limited to the particular arrangement disclosed and I intend in the appended claims to cover all modifications which do not depart from the spirit and scope of this invention.

What I claim as new and desire to secure by Letters Patent of the United States is:

1. In a system of power distribution having remotely situated synchronous dynamo-electric machines with an electrically long transmission line interconnected therebetween, one of said machines being an A.-C. generator for supplying power to said transmission line and provided with a field winding, a D.-C. exciter connected to supply excitation current thereto and itself being provided with a field winding, a resistor connected in circuit with said exciter field winding, a device for maintaining said machines in synchronous phase relation under abnormal conditions comprising an under voltage regulator for said resistor having an operating coil connected to be responsive to the voltage of said line, said under voltage regulator being responsive to decrease in the line voltage of said transmission line below a predetermined sub-normal operating value to decrease the effective value of said resistor sufficiently to abnormally increase the field excitation of said exciter, and a reactive power absorbing circuit connected to limit over voltage on said transmission line including electronic means responsive to a predetermined increase in said line voltage above a predetermined normal value to vary the amount of reactive power drawn by said power absorbing circuit in inverse relation to the change in phase relations of said machines, said under voltage regulator being provided with a time delay means for delaying the return of the field excitation of said said exciter to a normal value for a predetermined interval of time after the line voltage returns to normal.

2. In a system of power distribution having remotely situated synchronous dynamo-electric machines with an electrically long transmission line interconnected therebetween, one of said dynamo-electric machines being an A. C. generator for supplying power to said transmission line and provided with a field winding, a D. C. exciter connected to supply excitation current thereto and itself being provided with a field winding, a variable resistor connected in circuit with said exciter field winding and having a normal value corresponding to normal line operating voltage, a device for maintaining said dynamo-electric machines in synchronous phase relation under abnormal conditions comprising a regulator for said resistor having an operating coil connected to be responsive to the voltage of said transmission line, said regulator being responsive to decrease in line voltage of said transmission line below a predetermined abnormal operating value to decrease the effective value of said resistor from the normal value thereof corresponding to said normal operating line voltage, thereby to abnormally increase the output voltage of said exciter and a reactive power absorbing circuit connected to limit over voltage on said transmission line including electronic means responsive to increase in line voltage of said transmission line above said predetermined normal operating value to vary the amount of reactive power drawn by said power absorbing circuit in inverse proportion to the change in phase relations of said machines, said voltage regulator being provided with time delay means to delay return of the resistor in said exciter field to the normal value corresponding to said normal operating line voltage for a predetermined interval of time after the line voltage returns to normal.

3. An electrical distribution system comprising remotely situated synchronous dynamo-electric machines, an electrically long transmission line interconnected therebetween, one of said dynamo-electric machines being an A. C. generator for supplying power to said transmission line and provided with a field winding, a D. C. exciter connected to supply excitation current thereto and itself being provided with a field winding, a variable resistor connected in circuit with said exciter field winding, a device for maintaining said machines in synchronous phase relation including a regulator for said resistor having an operating coil connected to be responsive to the voltage of said transmission line, said regulator being responsive to normal line voltage of said transmission line corresponding to said synchronous phase relation to maintain said variable resistance at a value of resistance corresponding to said normal line voltage and responsive to decrease in said line voltage below a predetermined sub-normal value to decrease the effective value of said variable resistance below said corresponding value thereby to abnormally increase the output voltage of said exciter and a reactive power absorbing means including a reactive device in serial connection with an electronic device, said serial connection being connected in shunt connection with said transmission line and said electronic device being responsive to a predetermined increase in said line voltage above said normal value to draw reactive current therefrom inversely proportional to changes in phase relation of said machines, said voltage regulator being provided with time delay means to delay return of said variable resistance to said corresponding value for a predetermined interval of time after the line voltage returns to normal.

DAVID C. PRINCE.

REFERENCES CITED

The following references are of record in the file of this patent:

UNITED STATES PATENTS

| Number | Name | Date |
| --- | --- | --- |
| 762,744 | McKay | June 14, 1904 |
| 1,788,222 | Winter | Jan. 6, 1931 |
| 1,872,348 | Rudenberg et al. | Aug. 16, 1932 |
| 1,947,231 | Sabbah | Feb. 13, 1934 |
| 2,021,161 | Verman et al. | Nov. 19, 1935 |
| 2,390,786 | Geiselman | Dec. 11, 1945 |
| 2,407,072 | Gittings et al. | Sept. 3, 1946 |
| 2,421,786 | Haug | June 10, 1947 |
| 2,426,027 | Kovalsky | Aug. 19, 1947 |
| 2,470,454 | Alexanderson | May 17, 1949 |
| 2,546,725 | Crary | Mar. 27, 1951 |